US007901130B2

(12) United States Patent  (10) Patent No.: US 7,901,130 B2
Limb et al.  (45) Date of Patent: Mar. 8, 2011

(54) METHOD AND APPARATUS FOR CALIBRATING A THERMISTOR

(75) Inventors: Scott Jong Ho Limb, Palo Alto, CA (US); Michael Yu Tak Young, Cupertino, CA (US); Karl A. Littau, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 0 days.

(21) Appl. No.: 12/497,993

(22) Filed: Jul. 6, 2009

(65) Prior Publication Data

US 2009/0262776 A1 Oct. 22, 2009

Related U.S. Application Data

(62) Division of application No. 10/989,711, filed on Nov. 15, 2004, now Pat. No. 7,572,051.

(51) Int. Cl.
G01K 15/00 (2006.01)
(52) U.S. Cl. ............................................. 374/1; 374/183
(58) Field of Classification Search .............. 374/1, 102, 374/183, 137
See application file for complete search history.

(56) References Cited

U.S. PATENT DOCUMENTS

| 3,759,083 | A | * | 9/1973 | Erickson et al. ............... 374/107 |
| 4,059,982 | A | * | 11/1977 | Bowman ......................... 374/44 |
| 5,075,690 | A | | 12/1991 | Kneezel |
| 5,315,316 | A | | 5/1994 | Khormaee |
| 5,406,315 | A | | 4/1995 | Allen et al. |
| 5,406,361 | A | | 4/1995 | Kim |
| 5,428,206 | A | | 6/1995 | Uchida et al. |
| 5,485,182 | A | | 1/1996 | Takayanagi et al. |
| 5,528,276 | A | | 6/1996 | Katsuma |
| 5,576,745 | A | | 11/1996 | Matsubara |
| 5,585,825 | A | | 12/1996 | Kneezel et al. |
| 5,696,543 | A | | 12/1997 | Koizumi et al. |
| 5,745,130 | A | | 4/1998 | Becerra et al. |
| 5,881,451 | A | | 3/1999 | Kneezel et al. |
| 6,024,430 | A | | 2/2000 | Koitabashi et al. |
| 6,139,125 | A | | 10/2000 | Otsuka et al. |
| 6,299,273 | B1 | | 10/2001 | Anderson et al. |
| 6,302,507 | B1 | | 10/2001 | Prakash et al. |
| 6,302,509 | B1 | | 10/2001 | Iwasaki et al. |
| 6,601,941 | B1 | | 8/2003 | Jones et al. |
| 6,641,243 | B2 | | 11/2003 | Anderson et al. |
| 6,708,279 | B1 | | 3/2004 | Takenaka |
| 2003/0033055 | A1 | * | 2/2003 | McRae et al. ............... 700/266 |
| 2005/0093910 | A1 | | 5/2005 | Im |
| 2006/0170735 | A1 | | 8/2006 | Hong et al. |

FOREIGN PATENT DOCUMENTS

EP 19017 A1 11/1980
JP 03272854 A 12/1991

* cited by examiner

*Primary Examiner* — Lisa M Caputo
*Assistant Examiner* — Mirellys Jagan
(74) *Attorney, Agent, or Firm* — Fay Sharpe LLP

(57) ABSTRACT

The presently described embodiments are directed to a calibration method and system for thin film thermistors that are locally heated with integrated thin film heaters. Initially, print head temperature is either measured or referenced. Then, transient thermistor resistances are measured and used to determine the thermistor resistance at a higher temperature. Notably, this calibration method is advantageously implemented as a step of an existing process without having to expose the print heads to operating temperatures. In some implementations of the presently described embodiments, trimming of the thermistors may be required once calibrated.

6 Claims, 10 Drawing Sheets

| PH NUMBER | THERMISTOR R(ohm) @140 cel | VARIATION FROM TARGET (3400 ohm) | WIRE BOND LEFT | WIRE BOND RIGHT |
|---|---|---|---|---|
| PH56 | 3800 | +400 | 6 | 11 |
| PH57 | 3651 | +250 | 4 | 9 |
| PH59 | 3435 | +35 | 4 | 7 |
| PH60 | 3561 | +160 | 3 | 8 |
| PH69 | 3605 | +205 | 6 | 9 |
| PH70 | 3790 | +390 | 2 | 10 |

METHOD AND APPARATUS FOR CALIBRATING A THERMISTOR

This application is a divisional application of U.S. patent application Ser. No. 10/989,711, filed Nov. 15, 2004, which is hereby fully incorporated by reference herein.

BACKGROUND

The present exemplary embodiment relates to a method and apparatus for calibrating a thermistor. It finds particular application in conjunction with thermistors used in liquid drop ejectors such as print heads operative to emit phase change ink, and will be described with particular reference thereto. However, it is to be appreciated that the present exemplary embodiments are also amenable to other like applications.

By way of background, thermistors are often used on print heads to control temperature. In an effort to reduce cost and improve temperature control response, thermistors are deposited and patterned on a print head using thin-film or thick-film processes. Such a configuration is disclosed in co-pending and commonly assigned U.S. application Ser. No. 10/990,110, filed Nov. 15, 2004, entitled "Thin Film and Thick Film Heater and Control Architecture for a Liquid Drop Ejector" and having Michael Young et al. named as inventors, which application is hereby incorporated by reference herein.

When thin film fabrication is implemented, however, process variations of +/−10% in the sheet resistance and the temperature coefficient of resistance (TCR) are typical. This can result in large temperature measurement errors. Of course, accuracy and precision in temperature measurement is important for print head control and maintenance. Thus, to overcome this potential measurement error, every thermistor fabricated using thin-film techniques should be calibrated at the operating temperature of the print head. To do so, each print head must be brought to its operating temperature by external heating means. This may include the use of a heated chuck and a heated air gun, for example. Other methods may include adjusting a heater control unit until a proper drop mass is achieved. These approaches, though, result in excessive cost in terms of time and resources. Therefore, a low cost calibration method is needed.

Likewise, because of the thin film fabrication variations of +/−10% in sheet resistance and temperature coefficient of resistance (TCR), thin film thermistors may also need to be trimmed. The current industry method of trimming thin film thermistors is expensive. Therefore, a simple low-cost and manufacturable method for trimming thin-film thermistors is desired.

A variety of prior patents address calibrating and trimming thermistors. For example, U.S. Pat. No. 5,881,451, entitled "Sensing the temperature of a printhead in an ink jet printer," issued on Mar. 16, 1999. This patent describes a temperature compensation method for TCR variation but it assumes that TCR variation data is available for trimming.

U.S. Pat. No. 5,315,316, issued May 24, 1994, is entitled "Method and Apparatus for Summing Temperature Changes to Detect Ink Flow." This patent describes a print head temperature control circuit which includes a temperature sensor formed on the printhead substrate. The ink drop is measured and temperature is adjusted to the correct ink drop.

U.S. Pat. No. 5,075,690, issued Dec. 24, 1991 and entitled "Temperature Sensor for an Ink Jet Print Head" describes an analog temperature sensor. A more accurate response is achieved by forming the thermistor on the printhead substrate of the same polysilicon material as the heaters. The thermistor is calibrated and trimmed at the operating temperature.

U.S. Pat. No. 5,428,206, issued Jun. 27, 1995 and entitled "Positive Temperature Coefficient Thermistor Heat Generators" describes the implementation of a positive temperature coefficient (PTC) thermistor in parallel with a series combination of a high output foil heater and a bimetal switch. The bimetal switch opens when a desired temperature is reached. The positive temperature coefficient (PTC) thermistor purportedly maintains the heated object's temperature when the foil heater is switched off.

U.S. Pat. No. 5,406,361, entitled "Circuit for controlling Temperature of a Fuser Unit in a Laser Printer," issued on Apr. 11, 1995. This patent describes a circuit which compares first reference voltage, associated with an operational temperature (200 C), and second reference voltage, associated with a standby temperature (150 C), to a sensor dependent voltage for laser printer fuser temperature regulation. The sensor measures the temperature of the laser printer's fuser unit and this information was used to control the fuser heating unit. Negative temperature coefficient (NTC) thermistors are used. The circuit uses analog comparators and thus does not involve using A/D conversion and extra CPU clock cycles.

BRIEF DESCRIPTION

In accordance with one aspect of the present exemplary embodiments, the method comprises first measuring a first resistance of the thermistor at a first temperature, heating the thermistor, second measuring a transient resistance response of the thermistor through a range of varying temperatures, generating a plot of thermistor resistance against thermistor temperature based on the first and second measuring and calculating an operating temperature resistance based on the plot.

In accordance with another aspect of the present exemplary embodiments, the heating comprises applying a constant voltage.

In accordance with another aspect of the present exemplary embodiments, the method further comprises trimming the thermistor based on the operating temperature resistance.

In accordance with another aspect of the present exemplary embodiments, the method comprises first measuring a first resistance of the thermistor at a first temperature, heating the thermistor, second measuring a transient resistance response of the thermistor over time, generating a plot of thermistor resistance against thermistor temperature based on the first and second measuring and temperature profile data and calculating an operating temperature resistance based on the plot.

In accordance with another aspect of the present exemplary embodiments, the heating comprises applying a constant power.

In accordance with another aspect of the present exemplary embodiments, the method further comprises trimming the thermistor based on the operating temperature resistance.

In accordance with another aspect of the present exemplary embodiments, a means is provided to implement the methods.

DETAILED DESCRIPTION

The presently described embodiments are directed to a calibration method and system for thin film thermistors that are locally heated with integrated thin film heaters. This presently described technique(s) results in high heating efficiency. Initially, print head temperature is either measured or referenced. Then, transient thermistor resistances are measured and used to determine the thermistor resistance at a higher temperature. Notably, this calibration method is advantageously implemented as a step of an existing process without having to expose the print heads to operating temperatures. Thus, calibration according to these presently described embodiments will be virtually transparent to the process, with virtually no added costs of time or resources.

In some implementations of the presently described embodiments, trimming of the thermistors may be required once calibrated. Trimming thermistors typically requires changing the fabricated resistance to a set resistance value. In the presently described embodiments, selective wire bonding is used rather than laser trimming parallel lines. A set of bond pads are disposed in series where each bond pad adds to the total resistance of the thermistor. Depending on how much resistance needs to be added, the correct bond pad(s) can be programmed to be wired. This will result in the desire calibrated thermistor resistance without additional throughput time, process step, and equipment cost.

Figure 1:
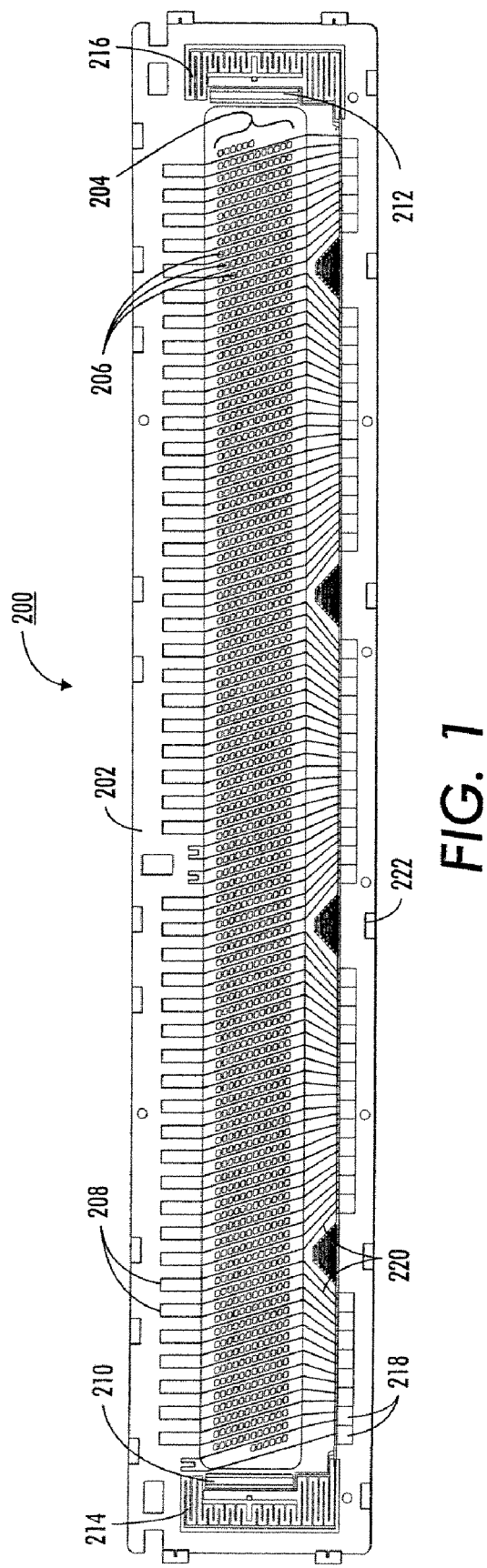
FIG. 1 is a top view of an example droplet ejector to which the presently described embodiments may be applied or into which the presently described embodiments may be incorporated.

With reference to FIG. 1, a liquid drop ejector 200 is shown. This exemplary drop ejector will typically include variations of +/−10% with respect to resistance and temperature coefficient of resistance. Such a variation is typical, as noted above. This is significant because thermistor resistance as a function of temperature is controlled by the following relationship, $R(T)=Ro(1+a\Delta T)$ where "a" is the temperature coefficient of resistance (TCR), Ro is the resistance at temperature To and $\Delta T$ is the difference between temperature T and temperature To. Accordingly, these variations result in varying thermistor resistance from print head to print head.

As noted, the problem might be addressed by fabricating thermistors with very small variations in resistance and in temperature coefficients of resistance. However, this approach is not practical. Another solution to the problem would be to determine the resistance at the actual operating temperature for each print head and simply trim the thermistor. However, as noted above, this is also not feasible. As such, the presently described embodiments—which include an approach whereby the thin film thermistor is calibrated without any additional process steps and, in some cases trimmed—is advantageously implemented.

In this regard, the liquid drop ejector 200 includes a jet stack 202 having a pixel zone 204 disposed therein. The jet stack is, in one form, made from layers of stainless steel that are configured to form ink channels and orifices for ejecting ink. One side of the jet stack serves as the jetting side (from where the ink is ejected) while the opposite side serves as the actuator side (having the actuating elements connected thereto). In FIG. 1, the actuator side is shown.

The pixel zone 204 comprises pixel elements (shown, for example, at 206) arranged in columns and rows on a surface of the jet stack 202. This pixel zone is disposed in the substantially center portion of the jet stack 202. For manufacturing purposes, a mesa is optionally formed on the surface of the jet stack and protrudes to allow for proper attachment of a metalized actuator element. This metalized actuator element is not shown. Moreover, it should be understood that the pixel elements 206 are driven by a driver chip in a range of approximately minus 40 volts to plus 40 volts. Each pixel element 206 is electrically connected to an input/output (or bond) pad (described below) for communication to these driver chips (not shown). The driver chips reside on a PCB with circuitry layer, i.e., a rigid printed circuit board, which is attached to the liquid drop ejector that house the actuator element that provide the forces to eject the ink. The drive signals are routed on the jetstack surface coplanar to the heater elements. These drive signal and heater element I/O pads are wire bonded to the rigid driver chip printed circuit board.

Thin film or thick film heater elements 208 are provided to columns of the pixel elements within the pixel zone. The heater elements 208 within the pixel zone 204 loop around columns of pixels 206 in the pixel zone 204. The liquid drop ejector 200 includes temperature sensors or thermistors 210 and 212, as well as additional heater elements 214 and 216 which lie outside the pixel zone. The thermistors may include two or four terminal for input/output functions. Still further heating elements may be formed on the liquid drop ejector (e.g., near ink feed ports and bond pads) to improve watt density distribution. As alluded to above, bond pads 218 and interconnect lines 220 are also formed on the jet stack. Note that, for ease of circuit connection, these pads are located on the same edge of the jet stack. It is also notable that the interconnect lines 220 are fanned out from the bond pads as illustrated to accommodate ink feed manifold ports 222 which are positioned on the liquid drop ejector 200. This configuration of fanning out the lines also allows for improved heat dissipation. In one form, the lines may be disposed at an angle from the perpendicular. This range will allow convenient access to all pixel element rows and columns.

It should be further noted that the interconnect lines 220 take two forms: heater lines and signal lines. The heater lines extend from the bond pads 218, as loops, around columns of pixel elements 206. The signal lines (not specifically shown) extend from appropriate bond pads 218 to corresponding pixel elements for control purposes. As shown, both types of lines are present in the fanned-out portions of interconnect lines 220 shown in FIG. 1.

Figure 2:
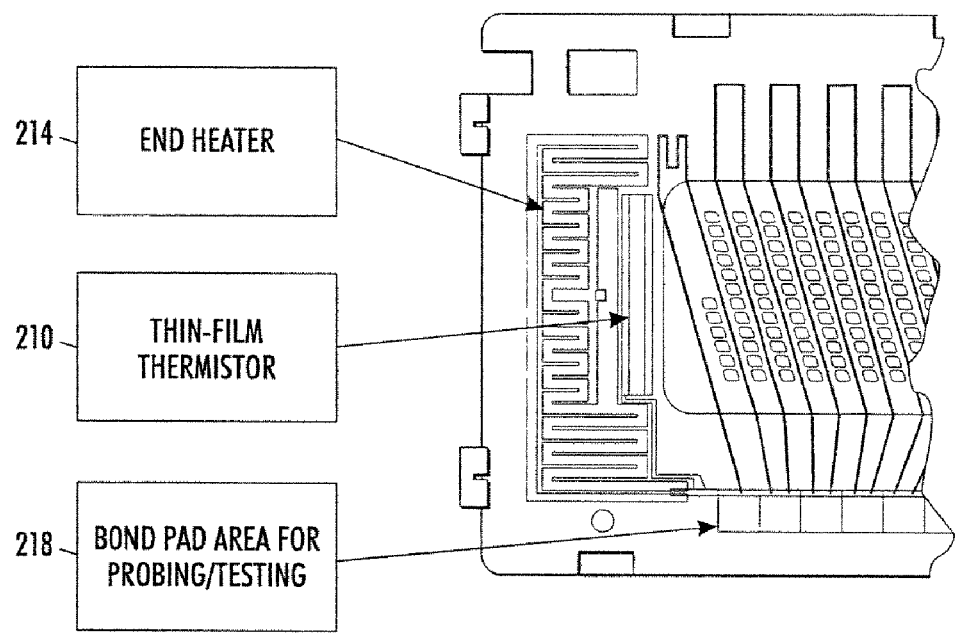
FIG. 2 is a partial top view of the droplet ejector of FIG. 1.

With reference now to FIG. 2, an end of the print head 200 is shown. As illustrated, the end heater 214 is shown as encompassing the thermistor 210. Also shown is the bond pad area 218. This example configuration is conducive to a useful calibration system configuration, although other configurations may be implemented in connection with the presently described embodiments. Such configurations will depend on a variety of factors but should, nonetheless, achieve the objectives of the presently described embodiments.

Figure 3:
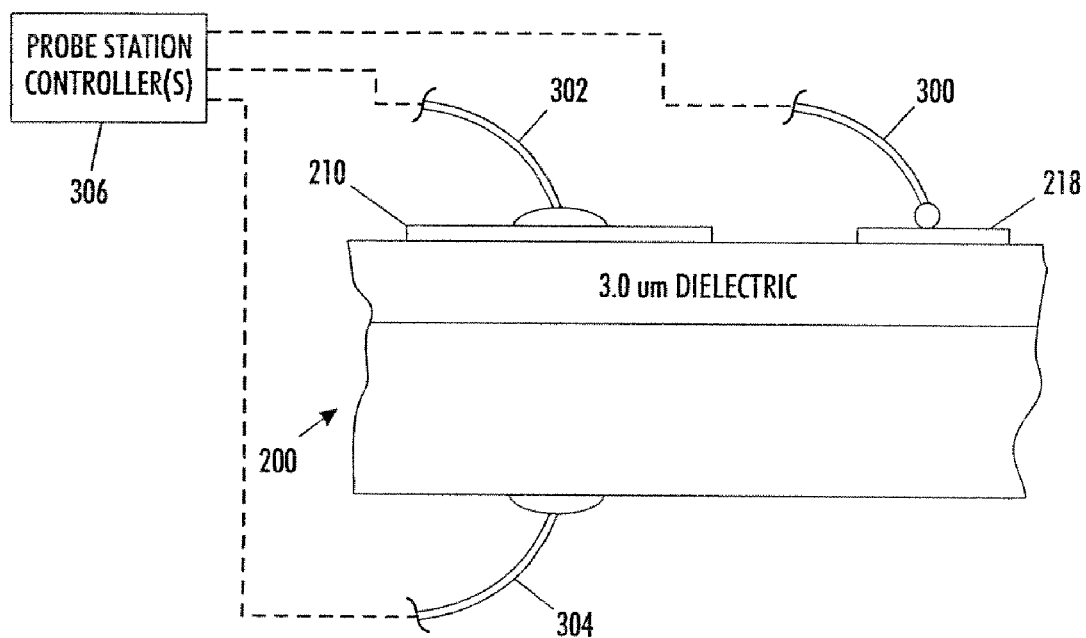
FIG. 3 is a cross-sectional view of a portion of the droplet ejector of FIG. 1.

In the configuration of at least one of the presently described embodiments, the only additional measurement taken during the probing and testing stage of the processing of the print head will be the measurement of resistance under temperature values according to the description herein. The increased time to accomplish this task will likely be minimal compared to the overall probing and testing time required for the print head. With this in mind, the configuration of FIG. 3 illustrates a cross-sectional view of the print head and the thin film layers along with suitable set-up hardware. Note that a probe tip 300 is used to engage the bonding pad 218. The probes are applied to the bond pads in this manner to suitably power the heater and measure the thermistor resistance. In addition, a single thermocouple, either thermocouple 302 or thermocouple 304, is attached to the front side or back side of the print head, respectively. As shown, the front side thermocouple 302 is attached directly to the thermistor 210. The back side thermocouple 304 is positioned to take its measurement through the print head 200. Also shown is a probe station controller(s) 306, which may be one or many controllers. This hardware configuration is significantly less expensive and more simplified than the experimental mechanisms that were heretofore known.

To make the thermistor calibration process transparent to the manufacturing process, the thermistor calibration process should be incorporated into existing processes that are performed on the print head during its manufacture and set-up. As such, the presently described embodiments implement the calibration process during the probe and test phases of the print head preparation process. Because every print head is electrically probed for defects, such as open circuits, bridges, short and short circuits, the probe and test stage is an advantageous opportunity to perform the calibration process according to the presently described embodiments. In this manner, no additional probe cards or equipment is needed. The existing probe station can be used to measure resistances at various temperatures and, since throughput time needs to be short compared to overall probe time, the method of calibration according to the present application is desired and useful.

In operation, the calibration method utilizes an existing thin film heater(s), such as thin film heater 214, to locally heat the thermistor, such as thermistor 210. This has been found to be the most efficient manner of heating the thermistors, although other methods such as the use of a heated chuck or localized hot gas could be used so long as the objectives of the presently described embodiments are achieved. As is apparent from FIGS. 2 and 3, the heaters and thermistors are in close proximity to one another and, in other forms, may be intertwined for better localized heating and response. Likewise, the bond pads are in close proximity to the thermistors and are located near the bottom of the print head for convenient probe card access.

The presently described embodiments contemplate at least two methods of determining resistance at the operating temperature of the print head. As such, two separate methods of thermistor calibration will be described. In this regard, the first described method involves the application of a constant voltage to the configuration and a continued measurement of temperature and resistance. The obtained data is then used as a basis to calibrate the thermistor. In the second described method, a constant power is applied to the configuration and resistance is measured. Based on the resistance data obtained and a reference temperature, the thermistor is calibrated.

It should be understood that the methods described herein may be implemented at the probe station where testing and probing of the ejector device would typically occur. As such, the routines that are implemented to assist in the calibration and, in some cases, trimming are stored in suitable memory locations and are run by processors or probe station controller(s), such as probe station controller(s) 306, that may form a part of the probe station or be added to the station. It will be understood by those skilled in the art that the probe station may take a variety of forms and that the routines noted above may be implemented using a variety of hardware configurations and software techniques.

Figure 4:
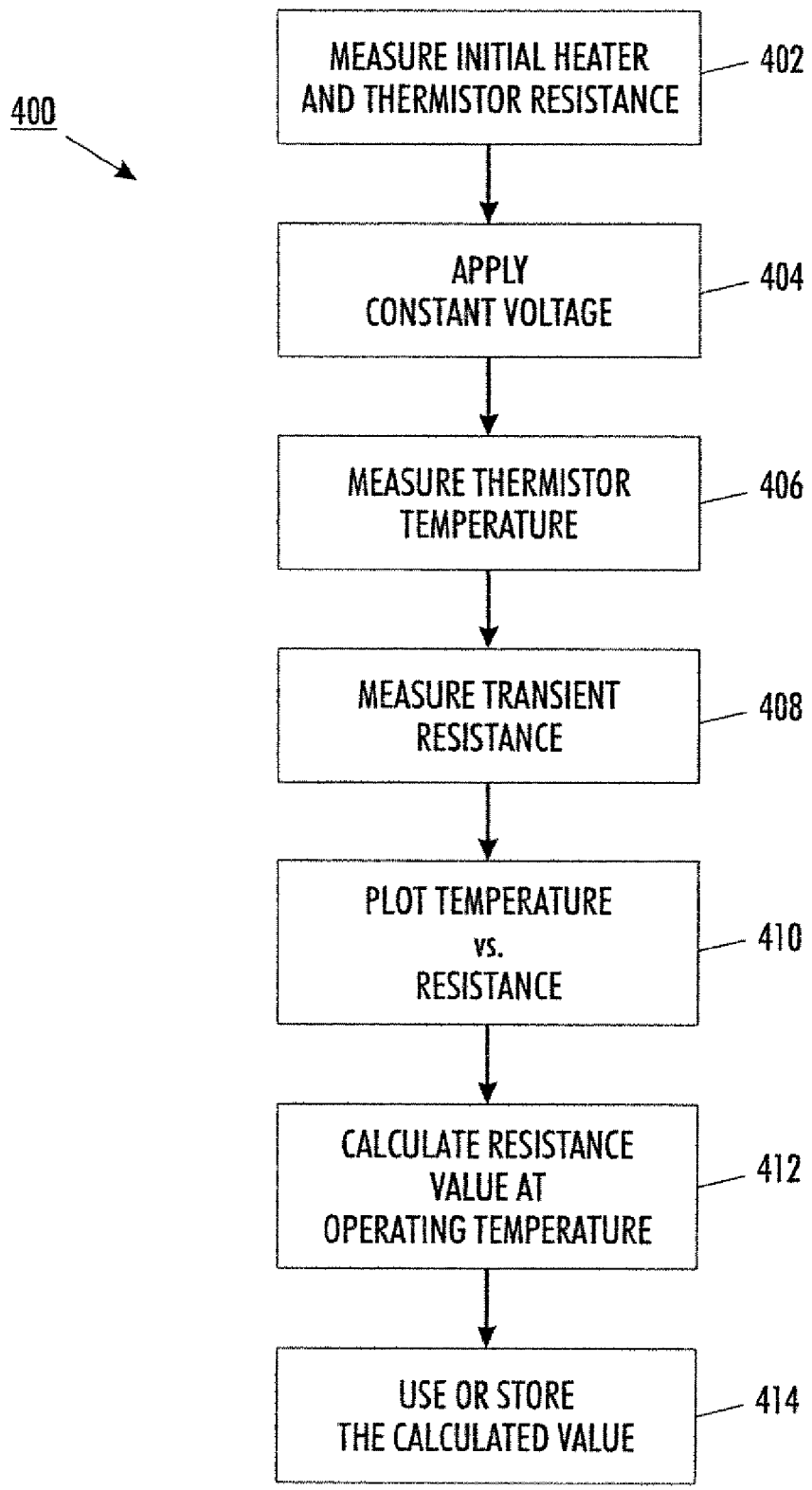
FIG. 4 is a flowchart illustrating a method according to the presently described embodiments.

More specifically, with reference now to FIG. 4, a method 400 is illustrated. Using this method, an initial heater resistance and thermistor resistance is measured at a set temperature, e.g. room temperature, using a variety of terminal measurements (at 402). In one form, four terminal measurements are taken to obtain this data. Next, a constant voltage is applied to the test probe (at 404). Thus, the input power to each print head will be different, given that the print heads vary in resistance values, as noted above.

While applying the constant voltage, transient temperature is measured with either a thermocouple on the probe card or in a probe station chuck (at 406). In this regard, the thermocouple will make contact with either the thermistor, e.g. as does example thermocouple 302 of FIG. 3, or an opposite side of the print head corresponding to the thermistor, e.g. as does example thermocouple 304 of FIG. 3. During this process, the transient resistance response of the thermistor is also measured in manners that are well known such as through the test probe (at 408).

The temperature and resistance is then plotted in one form of the presently described embodiments (at 410). From this plot, the resistance for a higher temperature, e.g., the operating temperature, can be calculated (at 412). Of course, because the relationship of temperature versus resistance is generally linear, a simply extrapolation can be used to calculate the appropriate resistance value at the operating temperature. Moreover, depending on the mathematical processing schemes that may be used, an actual plot may not be necessary.

The calculated value can then be used to trim the resistor at a later process step or be stored in memory for use as a set point value (at 414).

Figure 5:
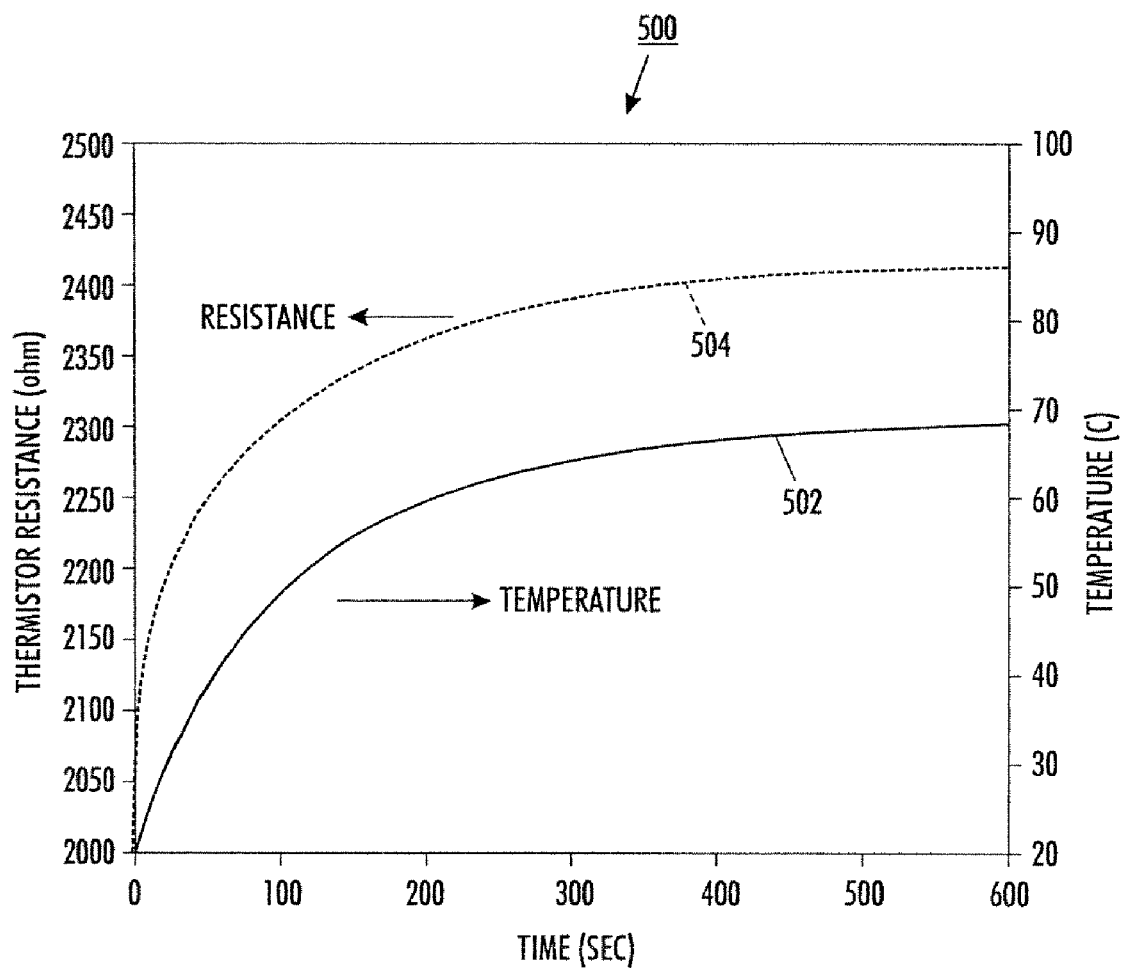
FIG. 5 is a graph of data obtained in implementation of the presently described embodiments.
Figure 6:
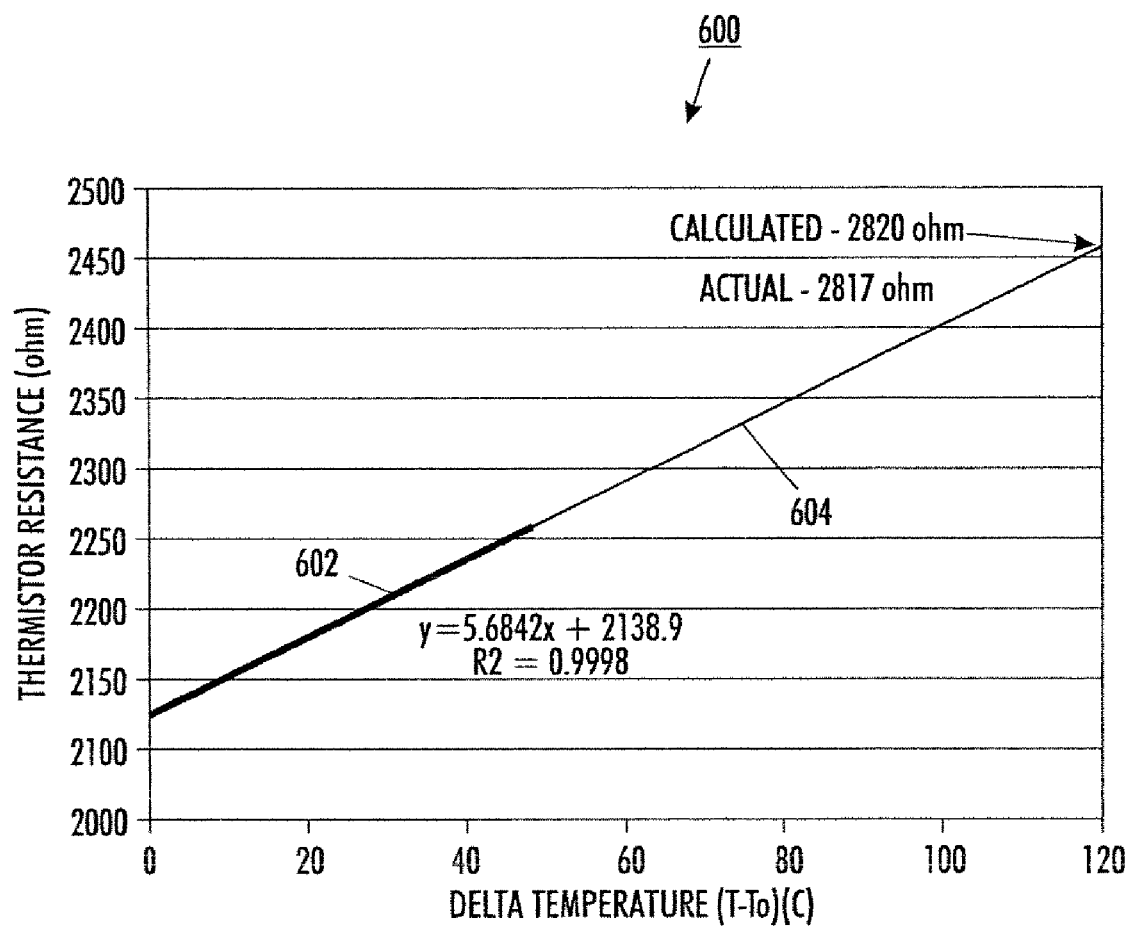
FIG. 6 is a graph of data obtained in implementation of the presently described embodiments.

The plots of FIGS. 5 and 6 illustrate and validate the implementation as described herein. As such, referring to FIG. 5, a temperature plot 502 and resistance plot 504 as functions of time are illustrated for a single example droplet ejector. This data is that which is gathered in, for example, 406 and 408 and is then used to plot a temperature versus resistance graph of FIG. 6, e.g. as in 410. As shown, the relationship between these two variables is substantially linear. The data that was obtained (e.g. the data in FIG. 5), is shown in FIG. 6 at 602. Also shown in FIG. 6 is data 604 that is extrapolated to calculate the resistance values at the operating temperature, e.g. as in 412 above. As should be understood, the extrapolation is relatively straight-forward in this case based on the fact that the relationship is linear. In this example, the calculated or extrapolated value is 2820 ohms, while the actual value (measured by bringing the printhead to actual operating temperature) is 2817 ohm.

Figure 7:
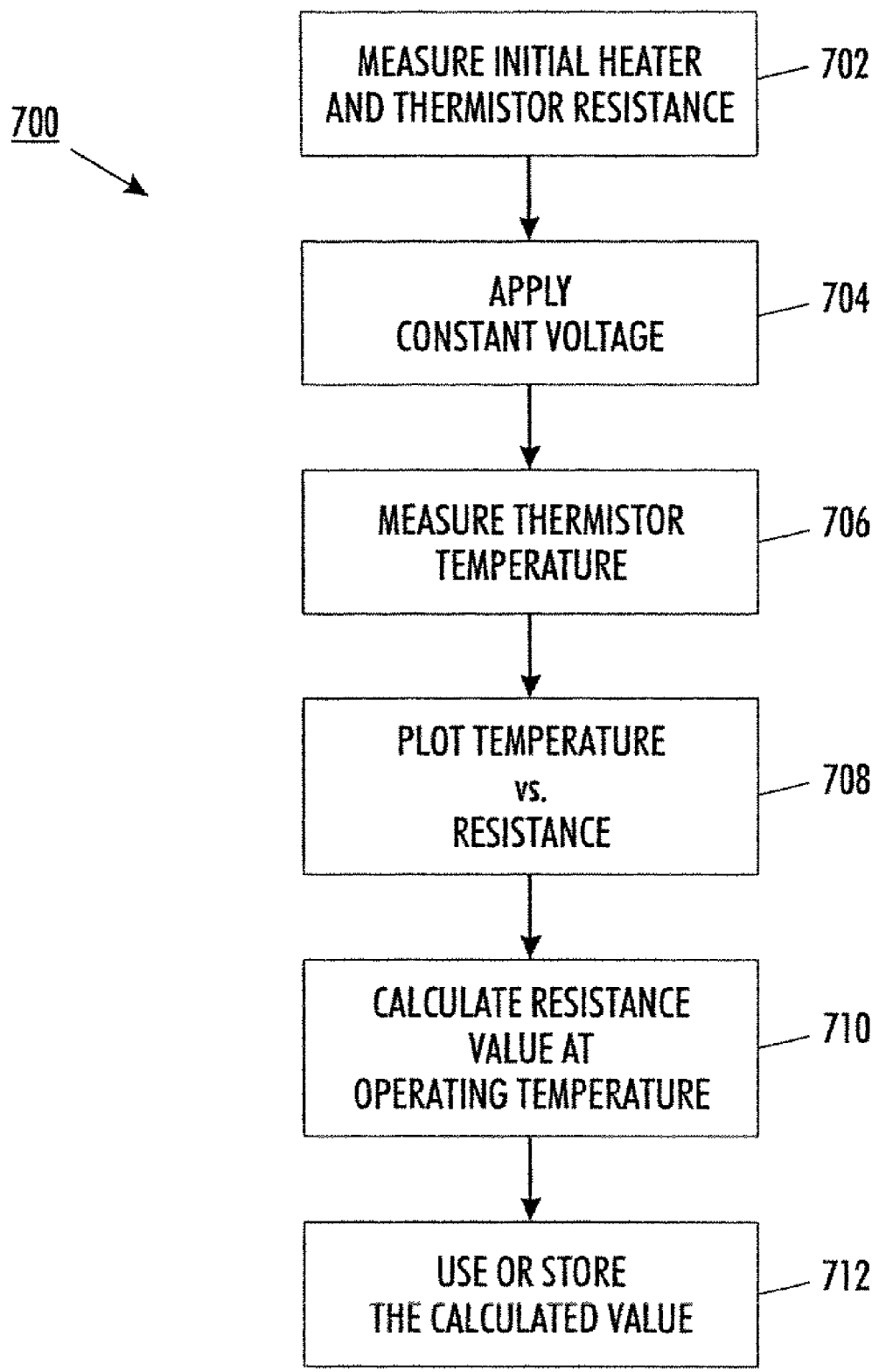
FIG. 7 is a flowchart illustrating a method according to the presently described embodiments.

With respect to the second method noted above, referring now to FIG. 7, a method for thermistor calibration 700 is illustrated. In this method, again, the heater resistance and thermistor resistance at a specified temperature, such as room temperature, is measured (at 702). Typically, four terminal measurements are used to obtain this data. Using initial heater resistance information, a set or constant power level is applied to the heater, e.g., heater 214 (at 704). It should be understood, that in this method, the applied power will be identical for all print heads. The current and voltage will be adjusted to maintain a constant power input throughout the heating process. In one form, the voltage is variable and the current is held constant. This will account for any heating variations due to heater line width, thickness and temperature coefficient of resistance variations.

During application of the constant power, the transient resistance response of the thermistor is measured using known techniques (at 706). Using a reference temperature response, temperature versus resistance is plotted (at 708). This is accomplished, in one form of the presently described embodiments, using a table look up. The table stores data on power levels and corresponding resistance and temperature values. The reference temperature is used to obtain data to generate a slope. This slope, coupled with the initial resistance value, e.g. the resistance value measured at room temperature at 702, allows for the plotting of a line, representing the linear relationship between the temperature and resistance values for the thermistor being calibrated. Then, a resistance value for a higher temperature, such as the operating temperature, is calculated based on a plot (at 710). As expected, this calculated may be a simple extrapolation. Lastly, the resistance value that is calculated may be used to trim the resistor during a later process step or it can be stored in a memory as a set point value (at 712).

Figure 8:
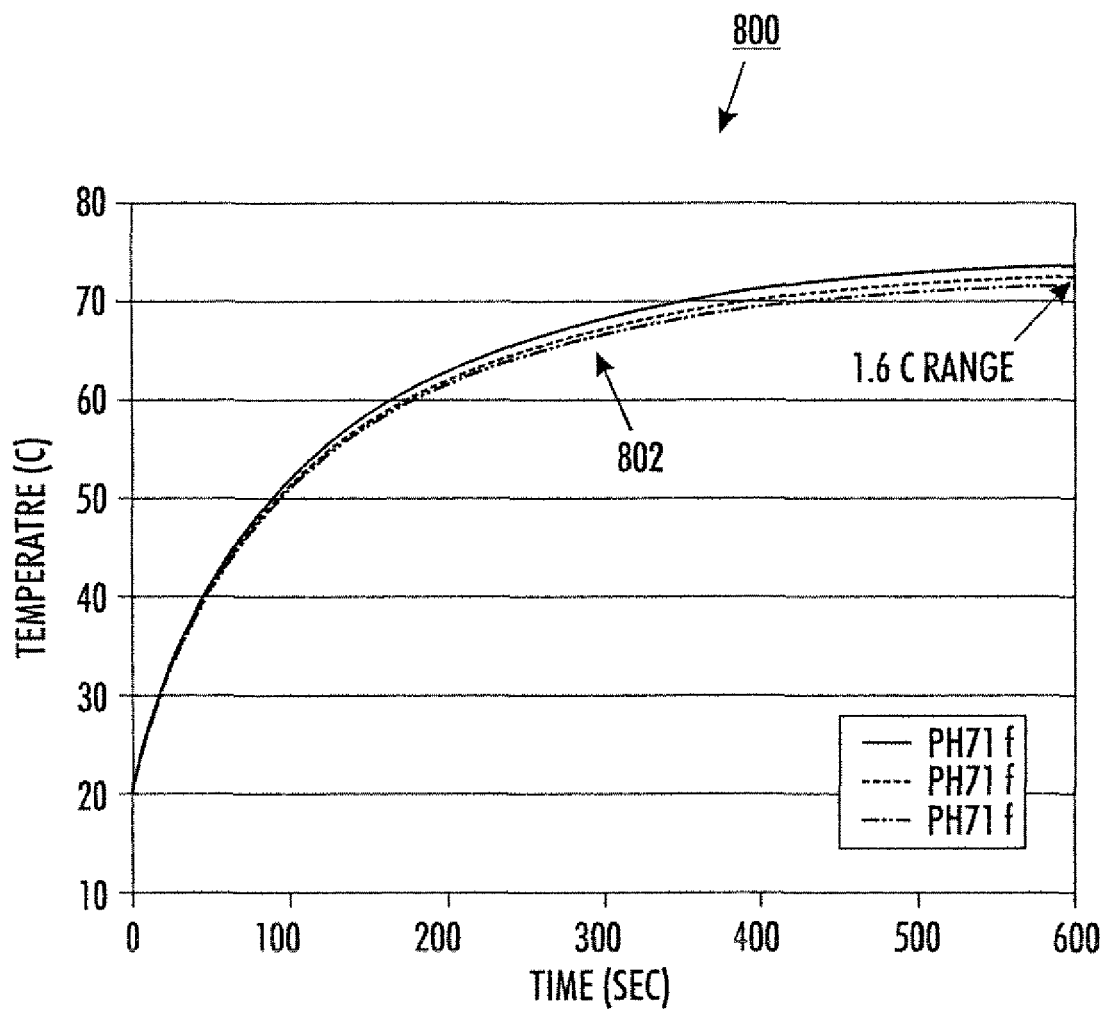
FIG. 8 is a graph of data obtained in implementation of the presently described embodiments.

This process relies on the phenomenon that temperature profiles of the thermistors for a given power level are relatively constant. This is illustrated in FIG. 8 wherein a plurality of profiles 802, corresponding to a plurality of thermistors, is illustrated. As shown, the profiles are consistent.

Figure 9:
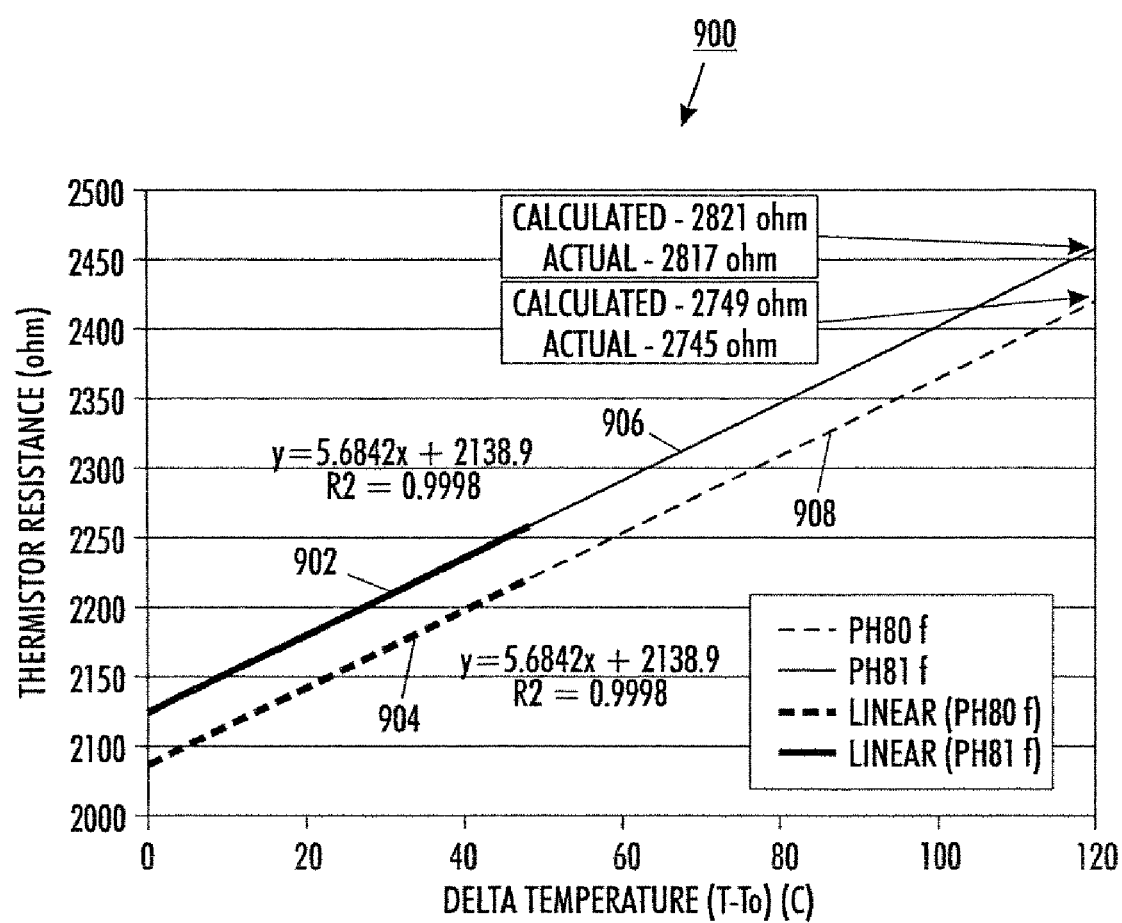
FIG. 9 is a graph of data obtained in implementation of the presently described embodiments.

As with the first method described above, the experimental results illustrate the effectiveness of the system. For example, referring now to FIG. 9, a graph 900 illustrates the measured and calculated plots or lines 902 and 904. These lines are extrapolated out to 906 and 908, respectively. As shown the extrapolated values are 2821 ohms and 2749 ohms for two different ejectors. The actual values for those devices are 2817 ohms and 2745 ohms. It is noted that the data presented in FIGS. 8 and 9 is data obtained using the front side of the ejector. In cases where data is obtained from the back side of the ejector, varying results should be expected.

Using either method, a low cost calibration method is realized. The data can be collected during probing and testing with minimal process time and no added costs. The thermistor can be locally heated using the thin film heaters already present on the print head and the transient response can be used to determine the operating thermistor resistance. As such, expected and known variations of the thin film processing of print heads can be accounted for in a simple and a low cost method to correct for such variations as realized. In this process, thermistors resistances at high operating temperatures can be determined from using low temperature readings. Because of the simple calibration technique, a broad range of process variations can be addressed.

As noted above, once the thermistor is calibrated, there are situations where trimming is accomplished. In order to make thermistor trimming transparent to the manufacturing process, it too needs to be incorporated into an already existing process.

Figure 10:
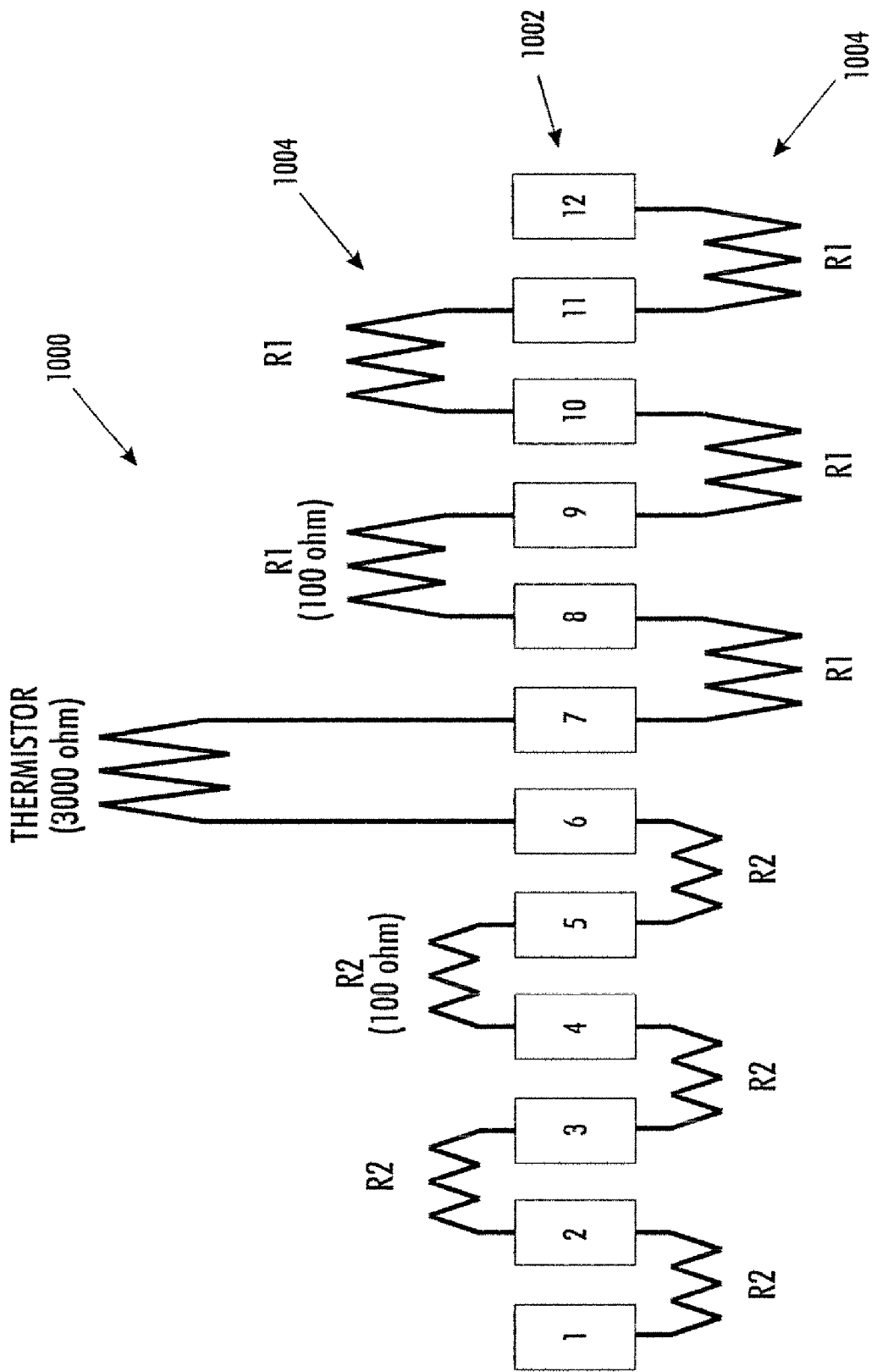
FIG. 10 is a trimming network according to the presently described embodiments.

The presently described embodiments propose trimming the thermistor using selective wire bonding. Since every droplet ejector will be wire bonded, separate programs can be used to wire bond the specific bond pads to get the desired total resistance. A sample layout 1000 is shown in FIG. 10. This layout would, in one form, be provided in a suitable location on the ejector in proximity to the bond pads.

As illustrated, there are 12 bond pads 1002, labeled 1-12. Pads 1-6 are designated for one wire bond and pads 7-12 are designated for the other wire bond. Since there are typically two wire bonds for the thermistor, one side will have increments of five 20 ohm pads, and the other five 100 ohm pads. These resistance values are measured at room temperatures. The total range that can thus be trimmed will be 600 ohms with 200 ohm precision. Alternative layouts can also be used for more precision trimming with 10 ohm accuracy. In addition, the resistors 1004, e.g. having R1 and R2, will be measured during probe for more accurate trimming.

Figure 11:
FIG. 11 is a table having values used in connection with the presently described embodiments.

An example implementation is illustrated in connection with FIG. 11, having a table 1100 depicted. Wire bond information for different ejectors PHs 56, 57, 59, 60, 69, and 70 populated the table 1100. In one form of the described embodiments, the wire bond left and right numbers can be used to designate a wire bonding recipe. There will be 72 different recipes. Thus, when an ejector is loaded onto a bonder, the operator will input the ejector number and the computer (e.g. controller(s) 306 of FIG. 3) will download the appropriate recipe. In manufacturing situations, it is advantageous to download the recipe from a computer in order to avoid any operator error. By entering the ID number, accountability can be established and the correct recipe can be used.

An automated process is contemplated by these trimming techniques. In this regard, a computer program or controller (e.g. controller(s) 306 of FIG. 3) may determine which bond pads to wire bond from the calibrated thermistor data. This can be accomplished using suitable routines stored in the controller. A bonding recipe that is unique to the lot number is assigned and stored in a database based on the determinations of the controller. When the lot number is entered into the bonder by an operator, the bonder retrieves the recipe and implements the appropriate trimming.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A method for calibrating a thermistor in a liquid drop ejector, the method comprising:
   first measuring a first resistance of the thermistor at a first temperature;
   heating the thermistor;
   second measuring a transient resistance response of the thermistor over time;
   generating a plot of thermistor resistance against thermistor temperature based on the first and second measuring and temperature profile data provided for the thermistor; and,
   calculating an operating temperature resistance for the thermistor based on the plot.

2. The method as set forth in claim 1 wherein the heating comprises applying a constant power.

3. The method as set forth in claim 1 further comprising trimming the thermistor based on the operating temperature resistance.

4. A system for calibrating a thermistor in a liquid drop ejector, the system comprising:
   means for first measuring a first resistance of the thermistor at a first temperature;

means for heating the thermistor;

means for second measuring a transient resistance response of the thermistor over time;

means for generating a plot of thermistor resistance against thermistor temperature based on the first and second measuring and temperature profile data provided for the thermistor; and, means for calculating an operating temperature resistance for the thermistor based on the plot.

5. The system as set forth in claim 4 wherein the means for heating comprises applying a constant power.

6. The system as set forth in claim 4 further comprising means for trimming the thermistor based on the operating temperature resistance.

* * * * *